United States Patent [19]

Leslie

[11] 3,906,654
[45] Sept. 23, 1975

[54] MINNOW TRAP AND METHOD OF MAKING SAME

[76] Inventor: Joel Leslie, Rt. 1, Nahunta, Ga. 31553

[22] Filed: June 20, 1974

[21] Appl. No.: 481,303

[52] U.S. Cl. .................................... 43/65; 43/100
[51] Int. Cl.² .................. A01K 69/06; A01M 23/08
[58] Field of Search ........................... 43/100, 55, 65

[56] References Cited
UNITED STATES PATENTS

| | | | |
|---|---|---|---|
| 885,671 | 4/1908 | Eason | 43/100 |
| 2,040,559 | 5/1936 | Luttrell | 43/55 UX |
| 2,219,981 | 10/1940 | Doan et al. | 43/65 |
| 2,603,028 | 7/1952 | Roberts | 43/55 |
| 3,691,667 | 9/1972 | Illinger | 43/65 |

*Primary Examiner*—Louis G. Mancene
*Assistant Examiner*—Daniel J. Leach
*Attorney, Agent, or Firm*—Newton, Hopkins & Ormsby

[57] ABSTRACT

A minnow trap is disclosed comprising an enclosure having water permeable metallic wire screen walls for containing minnows and at least one water permeable metallic wire screen frusto-conical entry through which minnows may enter. The enclosure is provided with an access slot through which bait may be manually inserted into the enclosure and trapped minnows removed therefrom. Zipper means are provided for opening and closing the access slot.

A method is also provided for making minnow traps by which method a substantially semi-circular first segment is cut from each side of a substantially square sheet of wire mesh screen. Each corner of the sheet is folded to overlap a portion of adjacent folded corners and the overlapping portions secured together thereby forming a container having openings in each corner thereof. A substantially semi-circular second segment is cut from each of the first semi-circular segments and the first segments formed into frusto-conical shapes and secured within the corner openings of the container.

7 Claims, 4 Drawing Figures

MINNOW TRAP AND METHOD OF MAKING SAME

BACKGROUND OF THE INVENTION

This invention relates generally to minnow traps, and particularly to minnow traps of the non-collapsible, permanently erected type, and to methods of making same.

Accordingly, it is a general object of the present invention to provide an improved minnow trap of the non-collapsible, permanently erected type.

Another general object of the invention is to provide an improved method of making a minnow trap of the non-collapsible, permanently erected type.

A more specific object of the invention is to provide a minnow trap of the type having a frusto-conically shaped entry with improved means for inhibiting minnow exit of the trap through the entry.

Another object of the invention is to provide a minnow trap having improved handling means to facilitate the manual insertion of bait into the trap and the manual removal of trapped minnows.

Another object of the invention is to provide a minnow trap of the non-collapsible, permanently erected type with enhanced structural integrity and longevity.

Yet another object of the invention is to provide a method of making non-collapsible, permanently erected minnow traps which method is easy to practice and which makes efficient use of construction materials.

SUMMARY OF THE INVENTION

In one form of the invention a minnow trap is provided comprising an enclosure having water permeable metallic wire screen walls for containing minnows and at least one water permeable wire screen frusto-conical entry through which minnows may enter the enclosure. The trap is provided with an access slot through which bait may be manually inserted into the enclosure and through which trapped minnows may be removed therefrom. Zipper means are provided for opening and closing the access slot.

In another form of the invention a minnow trap is provided comprising a generally rectangular sheet of wire mesh screen having an arcuate screen segment removed from each side and the sheet corners folded to overlap portions of adjacent folded corners and thereby form a box-like container having four corner openings. First fastening means are provided for securing the overlapping portions of the folded sheet corners together. Four frusto-conically shaped segments of wire mesh screen protrude into the container through the openings. Second fastening means are provided for securing the four frusto-conical segments of wire mesh screen to the container.

In yet another form of the invention a method is provided for making a minnow trap by which method a substantially semi-circular first segment is cut from each side of a substantially square sheet of wire mesh screen. Each corner of the sheet is folded to overlap a portion of adjacent folded corners and the overlapping portions secured together thereby forming a container having an opening in each corner thereof. A substantially semi-circular second segment is cut from each of the first semi-circular segments of wire mesh screen and the first semicircular segments formed into frusto-conical shapes and secured within the corner openings of the container.

DETAILED DESCRIPTION OF THE DRAWINGS

Figure 1:
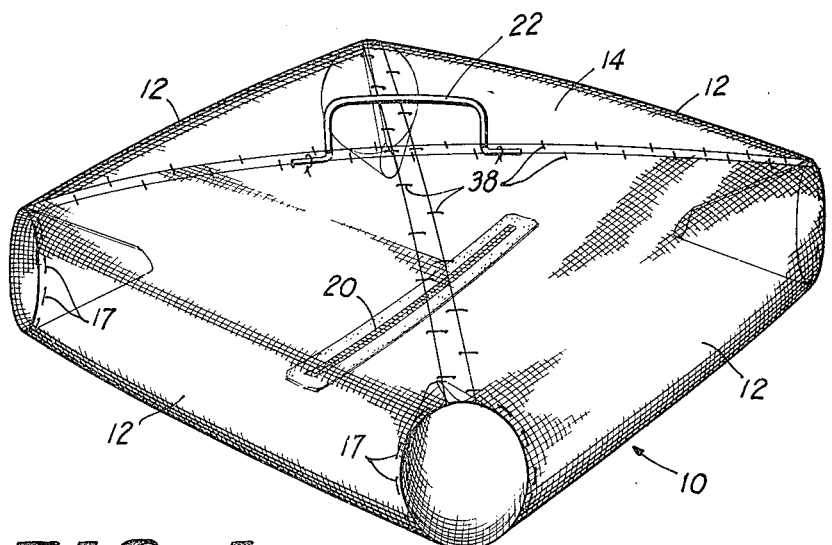
FIG. 1 is a perspective view of a minnow trap embodying principles of the invention in one preferred form.
Figure 3:
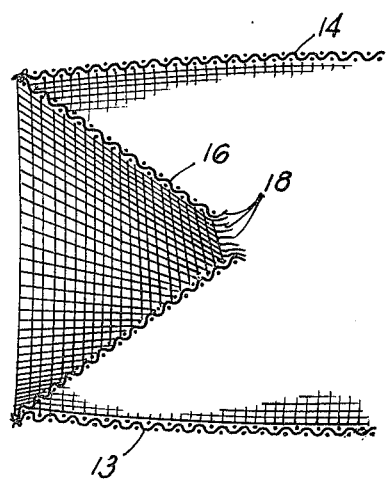
FIG. 3 is a side view of one frusto-conically shaped entry portion of the minnow trap shown in FIG. 1.

Referring now in more detail to the drawing, there is shown in FIG. 1 a minnow trap embodying principles of the invention in one preferred form and comprising an enclosure or container 10 formed essentially of metallic wire screen. The enclosure includes four side walls 12, a bottom wall 13, and a top wall 14. Each of the four corners of the box-like enclosure is provided with a generally circular opening into which a frusto-conically shaped wire mesh screen entry 16 protrudes. The entries are secured to the enclosure walls by a set of staples 17. As may best be seen by reference to FIG. 3 the end of each entry disposed within the bounds of the container walls is cut so as to leave an annually arranged set of prickly wire ends 18 projecting into the enclosure. These wire ends serve to inhibit minnows in any attempt to escape the trap by passing back through the entry to the container exterior. The bottom wall 13 is provided with a slot 32 which is overlaid with a zipper 20 which is secured to the wall by staples or threads. A handle 22 is secured to the top wall 14.

Figure 2:
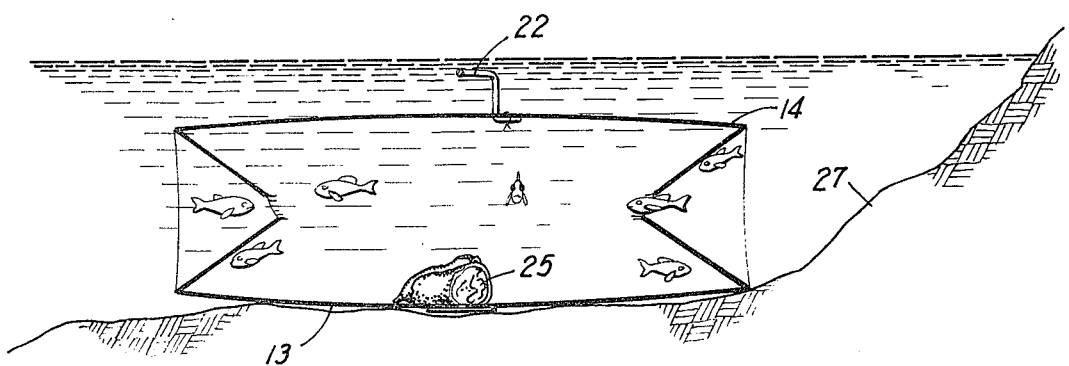
FIG. 2 is a side view in outline form of the minnow trap shown in FIG. 1 illustrated in a submerged operative situation.

For operation the trap may be baited by manually gripping handle 22 with one hand and then unzipping zipper 20 with the other hand. As shown in FIG. 2, bait 25 may then be inserted through the slot and placed on the bottom wall. While continuing to hold handle 22 the zipper may then be closed and the trap lowered into water upon a bed 27. Minnows thereafter attracted to the trap by the bait may pass through the frusto-conical entries and prickly wire ends 18 into the bounds of the trap. Any attempt thereafter to escape is inhibited by the difficulty of the minnows finding and negotiating passage through the prickly wire ends and entries. Subsequently, the minnows may be retrieved by gripping handle 22, removing the trap from the water, unzipping zipper 20 and manually removing the minnows.

Figure 4:
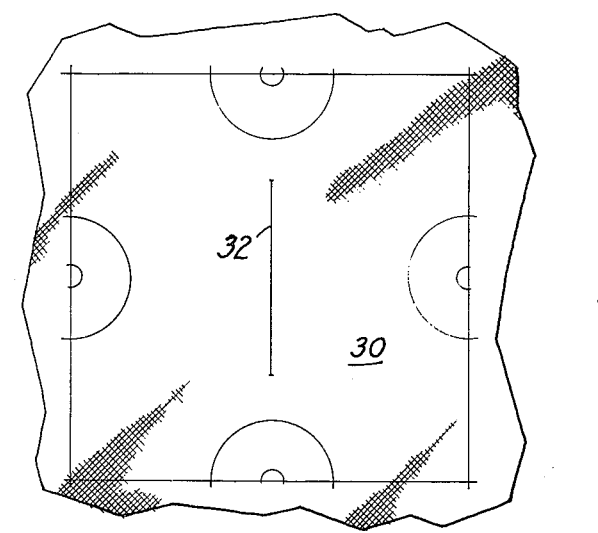
FIGS. 4 A–E are planned views illustrating a sequence of events in constructing the minnow trap shown in FIG. 1 from a blank of metallic screen wire.
Figure 4:
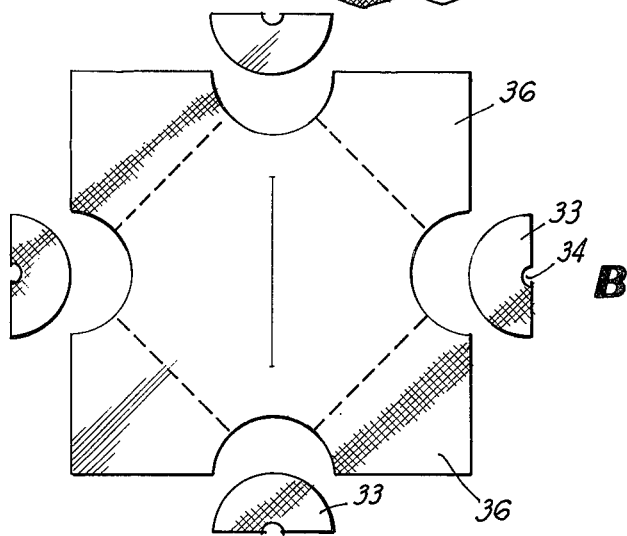
Figure 4:
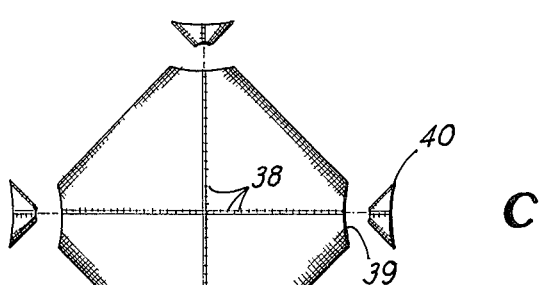
Figure 4:
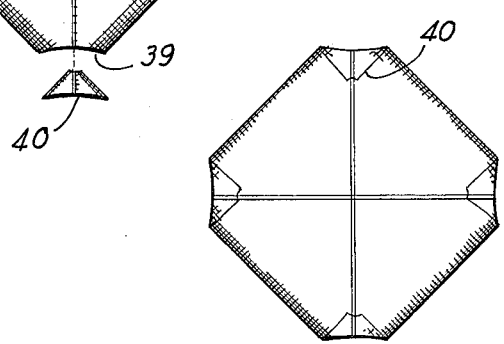
Figure 4:
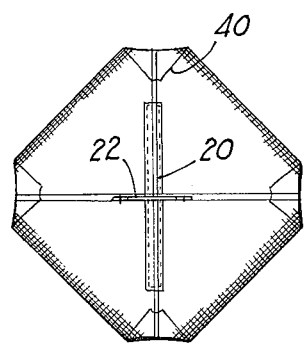

The just described trap may be formed both easily and with maximum use of materials by the method illustrated in FIG. 4 where in FIG. 4-A a substantially square blank of wire mesh screen 30 is shown having slot 32 formed in the center thereof. From each side of this blank four substantially semicircular segments of screen 33 are cut. From each of these segments is also cut a relatively small semi-circular segment leaving a void 34 in each of segments 33 which are then folded to form frusto-conical shape entries 40 and self-stapled for shape retention. Each corner 36 of the blank is then folded to overlay portions of adjacent folded corners and stapled with staples 38 thereby forming a box-like container having four corner openings 39. The frusto-conically shaped entries 40 are then inserted into the corner openings of the box-like container and secured in place by staples 17. Handle 22 is then secured to top wall 14 and zipper 20 to bottom wall 13 overlaying slot 32. With this mode of construction it is seen that substantially all of each blank of screen wire 30 is utilized. Construction itself is relatively simple and speedily performed in fabricating the trap. That metallic wire screen is employed as the basic material provides the trap with both structural integrity and longevity.

It should be understood that the just described embodiments merely illustrate principles of the invention in preferred forms. Many modifications may, of course, be made to the specifically illustrated embodiments without departure from the spirit and scope of the invention set forth in the following claims.

What is claimed is:

1. A minnow trap comprising an enclosure having water permeable metallic wire screen walls for containing minnows; at least one water permeable metallic wire screw frusto-conical entry through which minnows may enter the enclosure; an access slot formed on one of said enclosure walls through which bait may be manually inserted into the enclosure and trapped minnows removed therefrom; zipper means for opening and closing said access slot; and a handle secured to an enclosure wall opposite said one wall.

2. A minnow trap comprising a generally rectangular sheet of wire mesh screen having an arcuate screen segment removed from each side and the sheet corners folded to overlap portions of adjacent folded corners and thereby form a box-like container having four corner openings; first fastening means for securing the overlapping portions of said folded sheet corners together; four frusto-conically shaped segments of wire mesh screen consisting substantially of said removed arcuate segments of said generally rectangular sheet of wire mesh screen protruding into said container through said corner openings; and second fastening means for securing said four frusto-conically shaped segments of wire mesh screen to said container.

3. A method of making a minnow trap comprising the steps of:
   a. cutting a substantially semi-circular first segment from each side of a substantially square sheet of wire mesh screen;
   b. folding each corner of the sheet to overlap a portion of adjacent folded corners and securing the overlapping portions together thereby forming a container having openings in each corner thereof;
   c. cutting a substantially semi-circular second segment from each of the first semi-circular segments of wire mesh screen;
   d. forming the first semi-circular segments into frusto-conical shapes; and
   e. securing the frusto-conically shaped and first segments within the corner openings of the container.

4. The method of claim 3 wherein step (c) a semi-circular second segment is cut from each of the first semi-circular segments leaving wire ends protruding from the first segments; and wherein step (e) the frusto-conically shaped first segments are secured within the corner openings of the container with the protruding wire ends extending thereinto.

5. The method of claim 3 further comprising the step of:
   f. forming a slot in the container and mounting a zipper to the container overlaying the slot.

6. The method of claim 3 wherein step (b) the overlapping portions of adjacent folded sheet corners are stapled together.

7. The method of claim 3 wherein step (e) the frusto-conically shaped first segments are stapled to the container within the container corner openings.

* * * * *